Patented Mar. 3, 1942

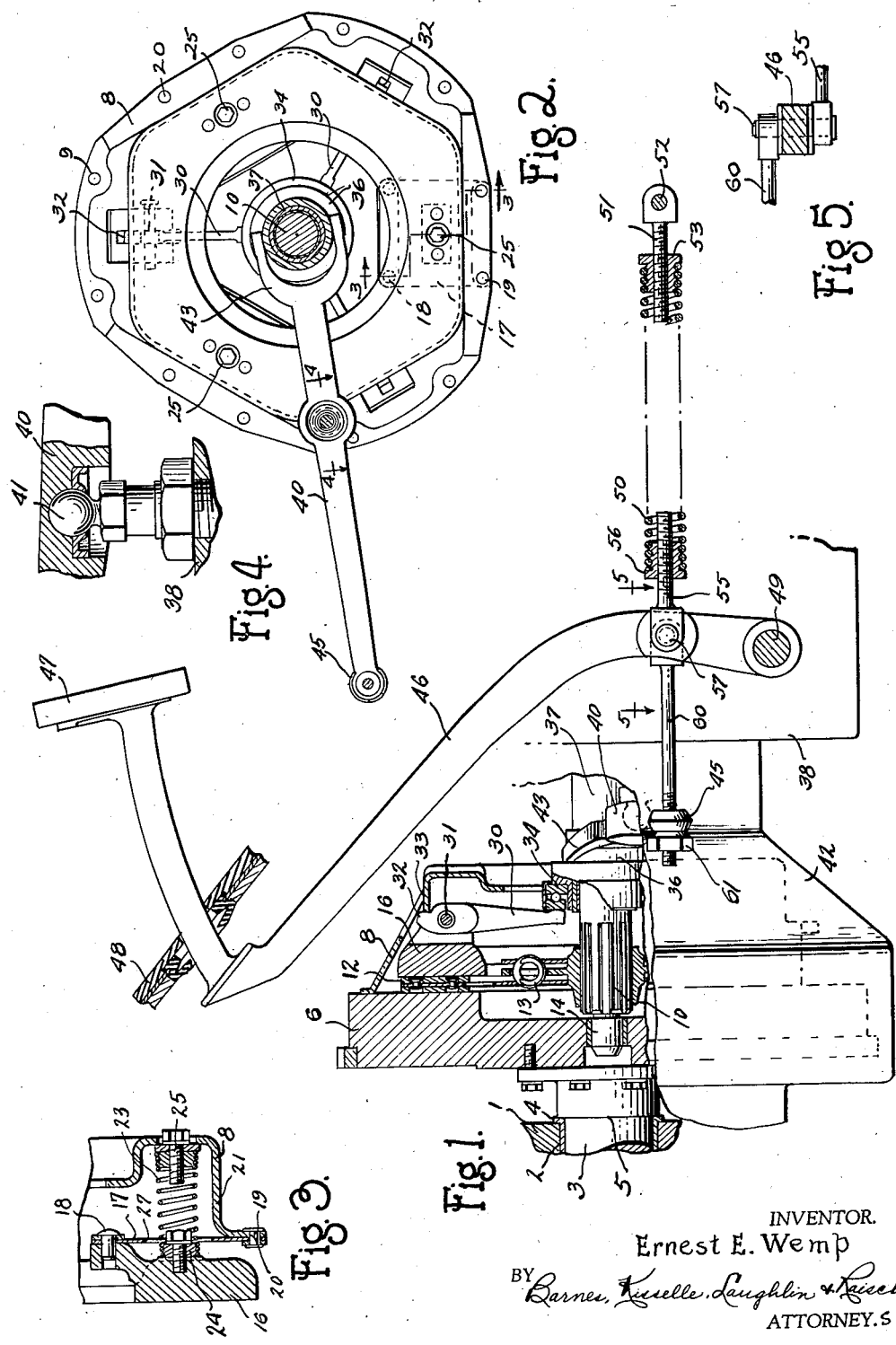

2,275,387

UNITED STATES PATENT OFFICE 2,275,387

FRICTION CLUTCH

Ernest E. Wemp, Detroit, Mich.

Application March 28, 1938, Serial No. 198,387

1 Claim. (Cl. 192—89)

This invention relates to a clutch, and particularly to one for use in automotive vehicles.

The invention is concerned particularly with a clutch and control mechanism therefor wherein clutch packing pressure is obtained by means such as a spring located outside of the clutch construction per se. Heretofore it has been the usual practice to put an annulus of coil springs in a clutch for obtaining clutch packing pressure, and with this arrangement the packing pressure is balanced out locally in the clutch construction. In accordance with this invention a number of springs are eliminated since one spring may be used which works through a considerable lever advantage, and the clutch packing pressure is delivered to the engine through its crank-shaft. Thus the forces are not balanced out locally but are taken by the engine on one or more bearings capable of taking such thrust.

One construction for carrying out the invention is shown in the accompanying drawing wherein Fig. 1 is a general view with parts cut away and parts in section illustrating a construction designed in accordance with the invention.

Fig. 2 is a rear elevational view of the clutch.

Fig. 3 is a sectional view taken substantially on line 3—3 of Fig. 2 showing the pressure plate mounting.

Fig. 4 is a detail sectional view taken substantially on line 4—4 of Fig. 2 showing a ball mounting for a clutch control arm.

Fig. 5 is a detail view taken substantially on line 5—5 of Fig. 1.

The engine, which most commonly is an internal combustion engine, is not shown in detail, but a part of the engine structure is illustrated at 1 equipped with a bearing 2 for the engine crank-shaft 3. The bearing may have a flange 4 for taking a thrust delivered thereto by a shoulder 5 on the crank-shaft.

A flywheel for the engine is illustrated at 6 to which is attached a cover plate 8. The general shape of the cover plate may be as illustrated in Fig. 2, and it has a flange provided with apertures 9 for the reception of cap screws which secure the cover plate to the flywheel. A driven shaft is illustrated at 10 upon which is mounted a clutch driven member 12 provided with the usual clutch facings, and the driven clutch member may be equipped with a vibration dampening construction 13. The driven shaft may be piloted in the flywheel as at 14.

The clutch pressure plate is illustrated at 16 and it is mounted to be driven with the flywheel and cover plate and so that it may be shifted axially to engage and disengage the clutch. This mounting preferably takes the form of flexible sheet metal driving plates 17, each secured at its inner edge to the pressure plate as at 18, and at its outer edge to the cover plate as at 19, the cover plate having apertures 20 for this purpose. These plates serve to drive the pressure plate, hold it centered, and yet are flexible to permit axial shift. In the shifting of the pressure plate axially, the points 18 move in straight lines paralleling the axis, and portions 21 of the cover plate may flex to take care of the varying distances between the points 18 and 19 in this action.

This clutch construction is preferably arranged so that, unless it is acted upon by an outside clutch packing pressure, it assumes a disengaged position. To this end, retractor springs 23 may be secured to the pressure plate as at 24 and to the cover plate as at 25, there being three of such springs used in the clutch construction illustrated as shown in Fig. 2. The segmental plates 17 and the retractor springs may be located so that each spring extends through an aperture 27 in a segmental driving plate.

The clutch is equipped with control levers, there being three levers shown in the clutch illustrated, and each lever is indicated at 30 pivotally mounted at 31 to the pressure plate and having an arm 32 arranged to abut against a portion 33 of the cover plate fashioned to provide a fulcrum. The inner ends of the lever are arranged to receive a load through the means, preferably, of an antifriction bearing 34.

Thus the levers are of the second order and provide maximum lever advantage, due to the fact that the load is delivered at one end of the lever and the fulcrum is at the other with the resistance in between.

The thrust bearing 34 may be mounted upon a shiftable member 36 which slides upon an extension 37 of the transmission housing 38.

A control arm is illustrated at 40 and it has a ball and socket mounting 41 on the bell housing of the engine, the bell housing being illustrated at 42. This control arm has a yoke formation 43 for engaging the member 36 and an apertured end 45.

A clutch pedal or lever is illustrated at 46 having a foot pad 47, the pedal extending through the floor boards 48 of the vehicle. The pedal has a fixed fulcrum 49. A spring is arranged to act on this pedal. The spring shown is illustrated at 50 and it is a tension spring, being adjustably secured at one end to a member 51 having a fixed pivotal mounting 52 through the means of a piece 53 screw threaded on the member 51, and to which the end convolutions of the spring are secured. A member 55 is secured to the other end of the spring through the means of a member 56, the member 55 being pivotally secured to the lever 46 through the means of a pin 57. The pin 57 may extend through the lever and a tension rod 60 is also pivoted on the pin and it extends through the aperture 45 in the control arm and is provided with a nut or abutment 61 for engaging the control arm.

The normal position of the parts is illustrated in Fig. 1 wherein the spring 50, which is a tension spring, retracts the lever and rocks the control arm 40 on its ball mounting by pulling the same through the rod 60. The yoke end positions the bearing 34 forwardly and the clutch levers 30 are rocked clockwise, to the end that the pressure plate is shifted forwardly and packed against the driven disc. This action extends the relatively light retractor springs 23. To further exemplify the action, the following example can be given. If a clutch packing pressure of about 1200 lbs. is desired, a spring may be used which has a force of about 135 lbs., but it will be noted that this spring acts through considerable lever advantage, considering both the control arm 40 and the clutch levers. The pressure required to overcome this spring for releasing the clutch, of course, depends upon the advantage given by the lever 46, but this may be in the vicinity of 30 or 35 lbs.

To release the clutch the pedal is depressed and the spring 50 extended, thus relieving the load on the clutch levers. The retractor springs pull the pressure plate away from the driven disc. At this time the pressure plate is substantially unloaded, but it is held firmly against rotational movement or oscillation relative to the flywheel and cover plate, so that conditions of vibration or a sudden change of R. P. M. does not cause any relative rotational movement with resultant noises.

Although the plates 17 serve to strongly hold the pressure plate, it will be noted that the pressure plate is free of load of the packing springs when the clutch is disengaged, and it is therefore susceptible to the influence of vibrations which may be caused by torsional vibrations in the engine. The system illustrated possesses a frictional action to dampen any movement caused by the influence of the torsional vibrations or the like and thus prevent noise. This friction comes about by reason of the frictional engagement of the portions 32 of the levers with the cover plate. Any oscillating tendency of the pressure plate relative to the engine and cover plate is dampened by frictional engagement of the levers with the cover plate. When the clutch is completely engaged the load on the friction surfaces is at its greatest; when the clutch is disengaged the load on the friction surfaces is lessened. As the clutch engages with increasing pressure and torque, the load on the levers is increasing and sets up a desirable dampening action at this time. Any such vibration is generally of a high frequency and small amplitude, and a friction control requires that there be no rocking action in the friction exerting means.

Moreover, the retractor springs 23 serve to keep the ends of the levers in engagement with the cover plate and throw-out bearing respectively, at all times of clutch disengagement, and the inner lever tips thus keep the thrust bearing race in contact therewith under pressure. This causes the race which contacts the levers to center itself on the balls of the bearing back to its proper position in every clutch engaging action.

Moreover, since the clutch packing spring is located outside of and relatively remote from the friction members of the clutch, it is not subject to the heat caused by friction. This is an advantage because at times considerable heat is generated, especially where a clutch is subjected to hard useage or abuses. Furthermore, since no packing springs are needed in the clutch construction itself, the space which might otherwise have been used by the springs, may be employed for a better or more desirable lever construction or construction of other parts, or the over-all dimensions may be reduced.

I claim:

A clutch comprising driving members connected for rotation substantially in unison and one of which is axially shiftable for clutch engagement and disengagement, a driven member arranged to be packed with the driving members, a plurality of clutch levers, means pivotally mounting each lever to one driving member, each lever having a rocking surface to surface engagement with the other driving member, a thrust bearing having a face for engaging the levers, means serving normally to retract the shiftable driving member for clutch disengagement, clutch packing means located outside the clutch structure and acting on the levers through the thrust bearing to load the shiftable driving member for clutch engagement, the load of the packing means on the levers and the surface to surface engagement of the levers furnishing a dampening action for the shiftable driving member, and means operable for the service operation of the clutch to free the levers and thereby relieve the shiftable clutch driving member of the packing load for clutch disengagement, the retracting means serving to maintain the free levers in contact with the thrust bearing while the clutch is released to keep the said face which engages with the levers under pressure and to thus maintain the surface to surface engagement for the dampening action during clutch release.

ERNEST E. WEMP.